United States Patent
Purdey (10) Patent No.: US 11,486,411 B2
(45) Date of Patent: Nov. 1, 2022

(54) SEAL ASSEMBLY

(71) Applicant: Cummins Ltd, London (GB)

(72) Inventor: Matthew J. Purdey, London (GB)

(73) Assignee: CUMMINS LTD., London (GB)

( * ) Notice: Subject to any disclaimer, the term of this patent is extended or adjusted under 35 U.S.C. 154(b) by 0 days.

(21) Appl. No.: 17/296,774

(22) PCT Filed: Dec. 11, 2019

(86) PCT No.: PCT/GB2019/053510
§ 371 (c)(1),
(2) Date: May 25, 2021

(87) PCT Pub. No.: WO2020/120962
PCT Pub. Date: Jun. 18, 2020

(65) Prior Publication Data
US 2022/0010806 A1 Jan. 13, 2022

(30) Foreign Application Priority Data
Dec. 14, 2018 (GB) ..................... 1820435

(51) Int. Cl.
*F04D 29/16* (2006.01)
*F04D 19/00* (2006.01)
*F16J 15/00* (2006.01)

(52) U.S. Cl.
CPC ......... *F04D 29/164* (2013.01); *F04D 19/002* (2013.01); *F16J 15/002* (2013.01)

(58) Field of Classification Search
CPC ..... F04D 29/164; F04D 19/002; F16J 15/002; F05D 2240/50; F05D 2240/55; F01D 5/04; F01D 11/00; F01D 11/003; F01D 25/16; F01D 25/183; F01D 25/18
See application file for complete search history.

(56) References Cited

U.S. PATENT DOCUMENTS 6,568,688 B1  5/2003  Boeck

FOREIGN PATENT DOCUMENTS

| EP | 1045178 A2 | 10/2000 |
|---|---|---|
| EP | 1394451 B1 | 3/2004 |
| WO | 2014209852 A1 | 12/2014 |

OTHER PUBLICATIONS

International Search Report and Written Opinion, issued by the European Patent Office, dated Mar. 11, 2020, for International Application No. PCT/GB2019/053510; 12 pages.

*Primary Examiner* — Aaron R Eastman
(74) *Attorney, Agent, or Firm* — Faegre Drinker Biddle & Reath LLP (57) ABSTRACT

A seal assembly for use in a turbomachine, the seal assembly comprising an oil seal plate; a rotatable component which defines a central axis and is received in a central aperture of the oil seal plate; and an annular seal which comprises a base and a sealing portion, the base being held by the rotatable component; wherein the sealing portion is configured to form a seal with the oil seal plate when the rotatable component and annular seal are rotating below a predetermined rotational speed; and wherein the sealing portion is configured to move radially outwards with respect to the central axis such that the sealing portion loses contact with the oil seal plate when the rotatable component and annular seal are rotating above the predetermined rotational speed.

20 Claims, 8 Drawing Sheets

SEAL ASSEMBLY

CROSS-REFERENCE TO RELATED APPLICATIONS

The present application is a national stage application of International (PCT) Patent Application Serial No. PCT/GB2019/053510, filed on Dec. 11, 2019, which claims the benefit of United Kingdom Application No. 1820435.4, filed Dec. 14, 2018, the complete disclosures of which are expressly incorporated by reference herein.

FIELD OF DISCLOSURE

The present disclosure relates to a seal assembly for use in a turbomachine.

BACKGROUND

Turbochargers are well known devices for supplying air to the intake of an internal combustion engine at pressures above atmospheric pressure (boost pressures). A conventional turbocharger comprises an exhaust gas driven turbine wheel mounted on a rotatable shaft within a turbine housing. Rotation of the turbine wheel rotates a compressor wheel mounted on the other end of the shaft within a compressor housing. The compressor wheel delivers compressed air to the intake manifold of the engine, thereby increasing engine power.

The turbocharger shaft is conventionally supported by journal and thrust bearings, including appropriate lubricating systems, located within a central bearing housing connected between the turbine and compressor wheel housing. It is desirable to provide an effective sealing arrangement at each end of the rotating shaft to prevent oil leakage from the central bearing housing into the compressor or turbine housing.

At the compressor end of the turbocharger, during normal operation, the sealing arrangement should be able to withstand the increasingly high boost pressures that are delivered by modern turbochargers. The pressure of the bearing housing is effectively the same pressure as the engine oil sump (typically around 100 mbar) and there is thus a pressure gradient between the bearing housing and the compressor housing which prevents the leakage of lubrication oil from the bearing housing into the compressor housing. The sealing arrangement typically comprises one or more ring seals arranged between the shaft and the bearing housing and received in respective grooves, in the manner of piston rings. The seals are arranged with a radial clearance so as to allow free rotation of the shaft but to restrict the flow to allow the pressure difference between the bearing housing and the compressor housing and/or the turbine housing to remain.

Low shaft speed, such as when the engine is idling or during exhaust braking, results in a reduction in pressure behind the compressor wheel. The low (or even negative) boost pressure at the compressor end can drop below the pressure in the bearing housing. As a result of the negative pressure difference over the seals (PDOS), oil is able to leak along the turbocharger shaft in the bearing housing, past the seals and into the compressor housing. The leakage of oil may be significant, for example, if idling or operating in engine braking mode occurs for extended periods of time. Leakage of oil into the compressor housing is undesirable as it contaminates the pressurised air entering the engine intake manifold.

It is one object of the present disclosure to obviate or mitigate the aforesaid disadvantage.

SUMMARY OF DISCLOSURE

According to a first aspect of the disclosure there is provided a seal assembly for use in a turbomachine, the seal assembly comprising an oil seal plate; a rotatable component which defines a central axis and is received in a central aperture of the oil seal plate; and an annular seal which comprises a base and a sealing portion, the base being held by the rotatable component; wherein the sealing portion is configured to form a seal with the oil seal plate when the rotatable component and annular seal are rotating below a predetermined rotational speed; and wherein the sealing portion is configured to move radially outwards with respect to the central axis such that the sealing portion loses contact with the oil seal plate when the rotatable component and annular seal are rotating above the predetermined rotational speed.

As the rotational speed of the rotatable component increases, the friction at the interface between the sealing portion and the housing increases. As a result of the increasing friction, the heat generated also increases. Seals are typically made of elastomeric or rubber materials which are not suitable for prolonged high temperature operation. If such seals are subject to prolonged high temperature operation, they may become damaged which may affect the sealing effect provided. By configuring the sealing portion to lose contact with the housing above a predetermined rotational speed, overheating of the seal is avoided as there is no friction between the sealing portion and the housing when contact is lost (i.e. above the predetermined rotational speed).

It is known to use gas pressure to seal the bearing housing of a turbomachine. The provision of a positive pressure differential between the outside of the bearing housing and the inside of the bearing housing prevents leakage of oil and/or gas. In order to maintain a positive pressure, and therefore maintain a sealing effect, the idle speed of the turboshaft must remain above a minimum value. The seal assembly of the present disclosure uses the sealing portion of seal to provide a sealing effect below the predetermined speed, that is to say, gas sealing is not used below the predetermined speed. This allows the idle speed of the turboshaft to be reduced as there is no requirement for a positive pressure differential. Reducing the idle speed of the turboshaft allows more efficient operation of the turbomachine.

The rotatable component may comprise a flange which defines an annular recess that receives the seal.

An internal diameter of the flange may be greater than an external diameter of the sealing portion.

Advantageously, this provides an annular space into which the sealing portion can move into when the rotatable component is rotating above the predetermined speed.

The flange may define an inner annular wall which limits radial movement of the sealing portion.

Advantageously, this prevents over-expansion of the annular seal. Over-expansion of the seal may damage the seal which can impair the ability of the seal to provide a sealing effect.

The seal assembly may further comprise an annular component which encircles at least part of the annular seal.

The annular component may be configured to provide a resilient bias to the sealing portion.

Advantageously, the resilient bias may enhance the sealing force applied by the annular sealing element such that the sealing force applied to the housing by the annular sealing portion is increased.

The annular component may comprise an annular body and a series of fingers which project from the annular body.

The fingers may extend axially to a distal end of the sealing portion.

Advantageously, the position, size and quantity of the fingers can be chosen such that the desired predetermined rotational speed at which the sealing portion moves radially outwards is achieved.

The fingers may extend radially inwards at the distal end of the sealing portion.

Advantageously, this prevents the sealing portion from extending axially which may occur when rotating at high speeds.

The seal may comprise an annular groove located between the sealing portion and the base.

Advantageously, the size and position of the groove can be chosen such that the desired predetermined rotational speed is achieved. Additionally, the groove provides a region of reduced stiffness, therefore providing a predetermined deformation region which deforms once the rotatable component, and therefore seal, are rotating above the predetermined rotational speed. Further additionally, the annular groove provides a space into which the sealing portion can deform into without its deformation being inhibited.

An outside diameter of the sealing portion of the annular seal element may be less than an outside diameter of the base of the annular seal element.

Advantageously, this allows the base of the annular seal element to be received by the annular recess of the flange, while providing an annular space between the sealing portion and the recess into which the sealing portion can deform. The sealing portion can deform into the space once the rotatable component, and therefore annular seal, are rotating above the predetermined rotational speed.

Above the predetermined rotational speed, the sealing portion may be configured to move radially outwards such that the internal diameter of the sealing portion increases by at least 0.1 mm.

Advantageously, it has been found that by providing an annular gap between the housing and the sealing portion that is at least this size, accidental contact between the oil seal plate and the sealing portion is avoided. Further, over-expansion of the sealing portion is avoided and a reduction of friction between the housing and the sealing portion is achieved.

The seal assembly may further comprise an annular resilient element which encircles the sealing portion of the annular seal.

Advantageously, this provides the sealing portion with increased resilience and can therefore allow a desired predetermined speed at which the sealing pressure provided by the sealing portion is zero to be achieved.

According to a second aspect of the disclosure there is provided a rotary seal for use in a seal assembly of a turbomachine, the rotary seal comprising a base; a sealing portion; and an intermediate portion located between the base and the sealing portion; wherein when intermediate portion is sufficiently stiff so as to allow the sealing portion provide a sealing effect and is sufficiently flexible such that when the seal rotates above a predetermined rotational speed, the sealing portion is configured to move radially outwards.

As discussed above, by configuring the internal diameter to increase above a predetermined rotational speed, friction between the seal and a component to be sealed against can be reduced.

The rotary seal may further comprise an annular component which encircles at least part of the rotary seal.

The annular component may be configured to provide a resilient bias to the sealing portion.

As discussed above, a resilient bias may enhance the sealing force applied by the annular sealing element.

The annular component may comprise an annular body and a series of fingers which project from the annular body.

The fingers may extend axially to a distal end of the sealing portion.

As discussed above, the configuration of the fingers can be chosen to achieve a desired predetermined rotational speed.

The rotary seal may further comprise an annular groove located between the base and the sealing portion.

As discussed above, this provides a region of reduced stiffness.

An outside diameter of the sealing portion is less than an outside diameter of the base.

As discussed above, this provides space into which the sealing portion can deform into.

Above the predetermined rotational speed, the sealing portion may be configured to move radially outwards such that the internal diameter of the sealing portion increases by at least 0.1 mm.

As discussed above, this avoids accidental contact between the sealing portion and the component with which the sealing portion is forming a seal with.

According to a third aspect of the disclosure there is provided a turbomachine comprising a turbine; a housing; a bearing housing; a compressor having a compressor impeller mounted within the housing on a shaft; a volume located behind the compressor impeller; a compressor seal assembly, the compressor assembly comprising: an oil seal plate; a rotatable component which defines a central axis and rotates with the shaft; an annular seal which comprises a base and a sealing portion, wherein the base is held by the rotatable component; wherein the sealing portion is configured to form a seal with the oil seal plate when the shaft is rotating below a predetermined rotational speed; wherein the sealing portion is configured to move radially outwards with respect to the central axis above the predetermined rotational speed such that the volume behind the compressor impeller is in fluid communication with the bearing housing.

As discussed above, by configuring the internal diameter to increase above a predetermined rotational speed, friction between the seal and a component to be sealed against can be reduced. Additionally, the idle speed of the turbocharger shaft can be reduced.

According to a fourth aspect of the disclosure there is provided a method of sealing a turbomachine, the turbomachine comprising a turbine; a housing; a bearing housing; a compressor having a compressor impeller mounted within the housing on a shaft; a volume located behind the compressor impeller; a compressor seal assembly, the compressor assembly comprising an oil seal plate; a rotatable component which defines a central axis and rotates with the shaft; and an annular seal which comprises a base and a sealing portion, wherein the base is held by the rotatable component; wherein the method comprises rotating the shaft below a predetermined rotational speed and forming a seal between the sealing portion of the annular seal and the oil seal plate; rotating the shaft above the predetermined rotational speed and moving the sealing portion radially outwards such that contact between the sealing portion of the annular seal and the oil seal plate is lost.

As discussed above, by configuring the internal diameter to increase above a predetermined rotational speed, friction between the seal and a component to be sealed against can be reduced. Additionally, the idle speed of the turbocharger shaft can be reduced.

At the predetermined speed a pressure in the volume located behind the compressor impeller may be greater than a pressure in the bearing housing.

At the predetermined speed the pressure in the volume located behind the compressor impeller may be at least 8 mbar greater than the pressure in the bearing housing.

The method may further comprise subsequently rotating the shaft below the predetermined rotational speed and moving the sealing portion radially inwards such that it forms a seal against the oil seal plate.

Features of each of the aspects of the disclosure may be combined with other aspects of the disclosure.

BRIEF DESCRIPTION OF THE DRAWINGS

Specific embodiments of the present disclosure will now be described, by way of example only, with reference to the accompanying drawings in which.

DETAILED DESCRIPTION

Figure 1:
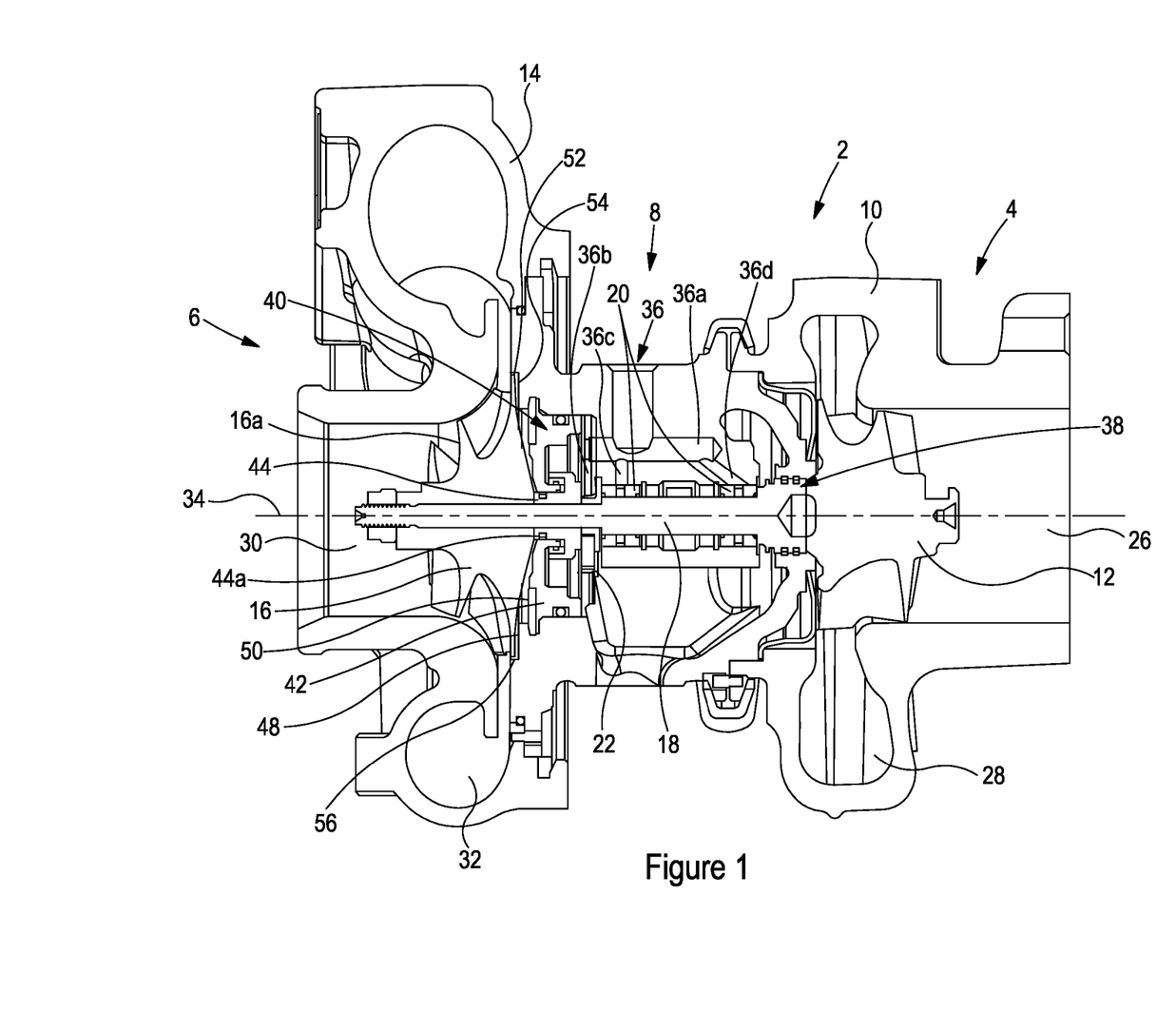
FIG. 1 depicts cross-sectional view of a turbocharger assembly comprising a seal assembly in accordance with the present disclosure.

FIG. 1 is a cross-sectional side view of a turbocharger 2 according to a first aspect of the disclosure. The turbocharger comprises a turbine 4 joined to a compressor 6 via a bearing housing 8. The turbine 4 comprises a turbine housing 10 and a turbine impeller 12. Similarly, the compressor 6 comprises a compressor housing 14 and a compressor impeller 16. The turbine impeller 12 and compressor impeller 16 are mounted on opposite ends of a shaft 18 which is supported on radial bearing assemblies 20 and a thrust bearing assembly 22 within the bearing housing 8. <The radial bearing assemblies 20 may comprise plain bearings. Alternatively, the radial bearing assemblies 20 may comprise roller bearings. The radial bearing assemblies 20 may be any bearing which can support a predominantly radial load,> The radial bearing assemblies 20 support a predominantly rotational load whilst the thrust bearing assembly 22 supports a predominantly axial load. Although a fixed geometry turbocharger is shown in FIG. 1, the disclosure is equally applicable to a variable geometry turbocharger.

The turbine housing 10 is provided with an exhaust gas inlet (not shown) and an exhaust gas outlet 26. The exhaust gas inlet directs incoming exhaust gas to an annular inlet volute 28 surrounding the turbine impeller 12. The exhaust gas flows through the turbine 4 and out of the exhaust gas outlet 26 via a circular outlet opening which is co-axial with the turbine impeller 12. Rotation of the turbine impeller 12 rotates the compressor impeller 16 which draws in air through axial inlet 30 and delivers compressed air to the engine intake via an annular outlet volute 32. The turbine impeller 12, shaft 18 and compressor impeller 16 are co-axial and rotate about a turbocharger axis 34.

The bearing housing 8 provides a lubricating system for the turbocharger assembly. The bearing housing 8 includes a series of channels 36, 36a-d, through which oil is supplied to the radial bearing assemblies 20 and thrust bearing assembly 22. A generally horizontal manifold 36a opens into a thrust bearing assembly oil line 36b and first and second roller bearing assembly oil lines 36c, 36d respectively. The channels 36, 36a-d receive oil from an engine oil circuit (not shown).

The bearing housing 8 also includes a turbine sealing assembly 38 and a compressor sealing assembly 40. The sealing assemblies 38, 40 seek to prevent oil leaking out of the bearing housing 8 and into either the turbine 4 or the compressor 6. The compressor sealing assembly 40 comprises an oil seal plate 42, a rotatable seal housing 44 and an oil seal ring 44a. The oil seal ring 44a is located in a groove of the rotatable seal housing 44 to reduce the leakage of oil from the bearing housing 8 into the compressor 6 and control blowby gas flow by virtue of small axial clearance between the oil seal ring and the rotatable seal housing and the oil seal ring and the oil seal plate 42. The oil seal ring 44a remains stationary during rotation of the shaft 18. The oil seal ring 44a may be formed of metal (e.g. steel, particularly 13% chrome alloy steel). The oil seal ring 44a is received by the groove of the rotatable seal housing 44 via a clearance fit. As a result the oil seal ring 44a inhibits but does not completely prevent passage of oil from the bearing housing 8 to the compressor 6.

Oil leakage into the compressor 6 is particularly undesirable because any leaked oil may be drawn into the engine intake via the annular outlet volute 32 along with the compressor inlet flow. Oil leakage into an air intake can be very damaging to an engine. The sealing assemblies 38, 40 therefore seek to isolate the bearing housing oil from the turbine 4 and compressor 6. In general, the sealing assemblies 38, 40 are not complete sealing arrangements and so do not entirely prevent the leakage of oil from the bearing housing 8 into the compressor 6 and/or turbine 4. This is due, at least in part, to the relative movement of components as a result of the rotation of the shaft 18, turbine impeller 12 and compressor impeller 16.

As discussed in the paragraph above, it is undesirable for oil to leak out into either the turbine 4 or compressor 6 from the bearing housing 8. Also as discussed above, it is particularly dangerous for oil to leak into the compressor 6, as the compressor supplies the engine with compressed air. Supplying the engine with compressed air mixed with leaked oil can damage an engine.

One way to reduce the leakage of oil from the bearing housing 8 into the compressor 6 is to ensure that a pressure on a compressor-side of the compressor sealing assembly 40 is higher than a pressure on a bearing housing-side of the compressor sealing assembly. Such a difference in pressure should reduce the leakage of oil from the bearing housing 8 into the compressor 6.

In order to obtain a pressure differential, it is known in the art to provide pressure to a volume 48 behind the compressor impeller 16. The term "behind the compressor impeller" is defined as a side of the compressor impeller 16 opposite blades 16a of the compressor impeller. The volume 48 is located on the compressor-side of the compressor sealing assembly 40. In the illustrated embodiment, the volume 48 is defined by a back face 50 of the compressor impeller 16, the bearing housing 8, the oil seal plate 42 and the rotatable seal housing 44. Alternatively, the volume 48 may be defined by a combination of one or more of the back face 50 of the compressor impeller 16, the bearing housing 8, the compressor housing 16, the shaft 18, the thrust bearing assembly 22 or the radial bearing assembly 20. The volume 48 may be any of a range of sizes such that pressure can practically be maintained within the volume. The volume 48 may have a continuous cross-section. Alternatively, the volume 48 may vary in cross-section.

A clearance exists in the form of a flow channel 52 between a portion of the bearing housing 8 and the compressor impeller 16 such that the volume 48 is not a sealed volume. The flow channel 52 also provides a clearance which is needed to allow the compressor impeller 16 to rotate. Fluid may flow through the flow channel 52 and, as a result, the volume 48 is capable of being pressurised by air compressed by the compressor impeller 16 via the flow channel 52.

The flow channel 52 comprises an annular recess 54 and an annular stepped outer portion 56. The recess 52 is a revolved cut, a profile of which is revolved about the turbocharger axis 34 into the bearing housing 8. The recess 54 forms an annular ledge if viewed from the compressor-side of the turbocharger axis 34. The annular recess 54 is shaped such that an amount of the air compressed by the compressor impeller 16 impacts an annular stepped outer portion 56, changes direction and flows between the annular recess 54 and the back face 50 of the compressor impeller 16 (via flow channel 52), into the volume 48. This flow of air into the volume 48 increases the pressure in the volume 48. The increase in pressure in the volume 48 reduces the chance of oil leaking from the bearing housing 8 into the compressor 6. This is achieved by creating a more positive pressure difference over the seals (PDOS) effect.

There are certain operating conditions wherein the oil pressure on the bearing housing side of the compressor sealing assembly 40 can exceed the pressure in the volume 48. Such conditions increase the likelihood of oil leakage into the compressor 6 from the bearing housing 8. The conditions under which oil leakage into the compressor 6 from the bearing housing 8 is most likely are low speed of shaft 18 and low pressure ratio operations, including choked operation. Furthermore, an increased oil pressure in the bearing housing 8 due to blow-by or crank case gases can exacerbate the leakage of oil into the compressor 6. In such operating conditions, the seal ring 44a inhibits the flow of oil out of the bearing housing and into the compressor.

Low speed operation occurs when the turbocharger rotates at a low number of rotations per minute (RPM). An example of a low number of RPM may be below 25 k (i.e. 25,000 RPM). A turbocharger may be said to be idling when rotating at between 5 k and 25 k RPM (i.e. 5,000 to 25,000 RPM). While operating at these low or idling speeds, the compressor impeller 16 may not be able to generate a pressure in the volume 48 which is higher than the oil pressure in the bearing housing 8. However, even when the turbocharger is rotating at a low RPM, including idle, condition (i.e. 5 k to 25 k RPM), the compressor impeller 16 is imparting work on the air and is therefore providing some air to the volume 48. The main problem at low speed operation is that, although air is pressurised in the compressor housing 14, air is not sufficiently pressurised in the volume 48. Accordingly, the volume 48 may not be sufficiently pressurised to prevent the leakage of oil from the bearing housing 8.

Low pressure ratio operation occurs when the turbocharger 2 is operating in the choke condition. Pressure ratio in the compressor is defined as the ratio of the annular outlet volute 32 pressure to the axial inlet 30 pressure. Choke occurs when the resistance to flow in the annular outlet volute 32 drops below normal levels. As a result of the low resistance, the annular outlet volute 32 flow experiences a very low back pressure. Accordingly, the low back pressure leads to an increase in the compressor output as the gas velocity increases in the compressor 6. The gas velocity can only increase until a near-sonic flow velocity is reached, when the flow approaches incompressibility. At this point, the compressor 6 operates inefficiently and with high annular outlet volute 32 temperatures (up to around 230° C.). In such conditions, the compressor 6 flowrate is high but the increase in pressure between the axial inlet 30 and the annular outlet volute 32 is comparatively low, due to the inefficient operation of the compressor 6 in the choke condition.

Choke is undesirable for a number of reasons including low compressor efficiency, increased risk of component damage and excessively high operating temperatures. Choke is also undesirable because operating in the choke condition can give rise to low PDOS which can lead to the leakage of oil and other lubricant from the bearing housing 8 into the compressor 6.

Figure 2:
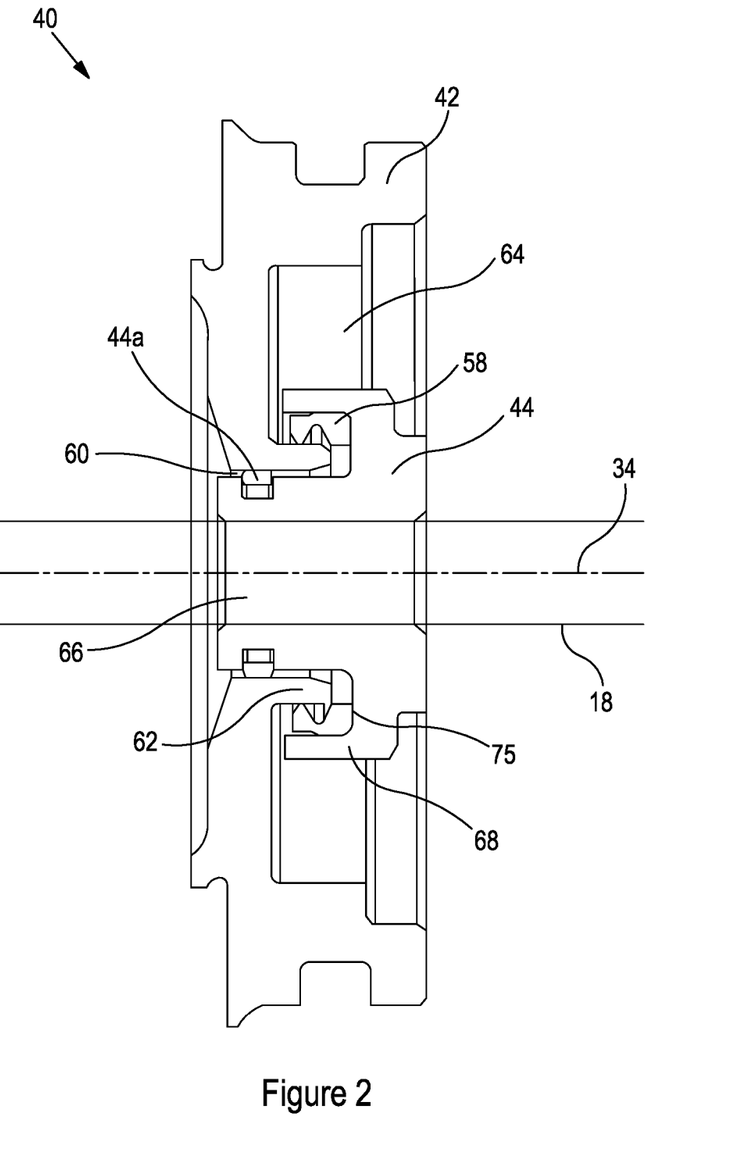
FIG. 2 depicts a cross-sectional view of a seal assembly in accordance with an embodiment of the present disclosure.

The compressor seal assembly 40 of the present embodiment, which is best seen in FIG. 2, comprises the oil seal plate 42, the rotatable seal housing 44 and the oil seal ring 44a, as noted above. The compressor seal of the present embodiment further comprises an annular seal 58. The components of the compressor seal assembly 40 are generally coaxial about the turbocharger axis 34.

The rotatable seal housing 44 is fixed with respect to the shaft 18 of the turbocharger 2. That is to say, the rotatable seal housing 44 rotates with the shaft 18. The annular seal 58 is fixed with respect to the rotatable seal housing 44. That is to say, the annular seal 58 rotates with the rotatable seal housing 44. The oil seal plate 42 is generally annular. The term 'oil seal plate' should be interpreted as meaning any structure against which a seal may be formed. The oil seal plate 42 functions as, among other things, a housing for the other components of the compressor seal assembly 40. That is to say, the oil seal plate 42 encircles the other components of the compressor seal assembly 40. Although the oil seal plate 42 is depicted as encircling the entire axial length of the other components of the compressor seal assembly, the oil seal plate 42 does not necessarily encircle the entire axial length of the other components of the compressor seal assembly 40. The depicted oil seal plate 42 also serves to clamp the thrust bearing assemblies 22 in place on the shaft 18. Additionally, the oil seal plate 42 serves as a compressor 6 diffuser face. However, the oil seal plate 42 need not always serve all of these functions. The oil seal plate 42 comprises a recess 64 which provides the oil seal plate with space to receive at least the rotatable seal housing 44 and the annular seal 58. The recess 64 may also receive other components. The recess 64 also serves to collect oil from the bearing housing 8 and drain the oil back into the bearing housing 8. In order to aid draining of the oil, the oil seal plate may comprise a baffle (not shown). The oil seal plate 42 comprises a central aperture 60. The central aperture 60 receives at least a portion of the rotatable seal housing 44 and the shaft 18 extends through the central aperture. The oil seal plate 42 further comprises an annular flange 62. The annular flange 62 extends axially towards the bearing housing 8. The annular flange 62 may therefore be referred to as an annular axial flange. The annular seal 58 forms a seal with the annular flange 62.

Figure 3:
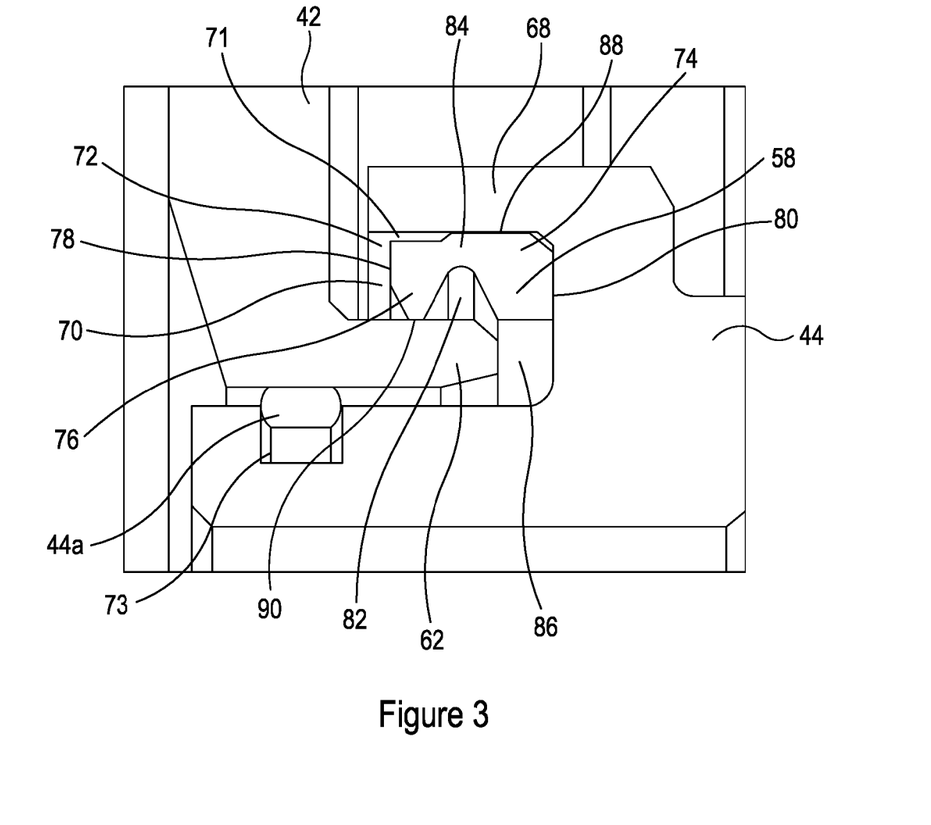
FIG. 3 depicts an enlarged view of FIG. 2.

The rotatable seal housing 44 is generally annular and comprises a central aperture 66. The shaft 18 extends through the central aperture 66. The rotatable seal housing 44 comprises a flange 68, which is best seen in FIG. 3. The flange 68 comprises a recess 70 which receives the annular seal 58. The flange 68 may define an inner annular wall 72. The inner annular wall 72 may be defined by the internal diameter of the flange 68 of the rotatable seal housing 44. As can be seen in the figures, the flange 68 extends towards the compressor 6 and there is an axial clearance between the flange and the oil seal plate 42. This axial clearance may be at least 0.2 mm. It may be desirable to axially extend the flange 68 towards the compressor 6 such that the flange extends axially beyond the annular seal 58 in order to prevent the annular seal 58 from extruding radially out of the flange. A radially inwardly projecting rib may be provided at a distal end of the flange 68 (not shown). During rotation of the turbocharger shaft 18, the annular seal 58 may spread axially towards the compressor due to the effect of centrifugal force. The inwardly projecting rib may prevent the annular seal from extending beyond the distal end of the flange 68 (this would be undesirable because it would cause damage to the seal).

The rotatable seal housing 44 may also comprise a recess 73 which receives the oil seal ring 44a. Although the present embodiment is being described with respect to a rotatable seal housing 44, the rotatable seal housing may be replaced with any suitable rotatable component as required. For example, the rotatable seal housing 44 may be replaced with an oil slinger which is capable of housing the annular seal 58.

Figure 4:
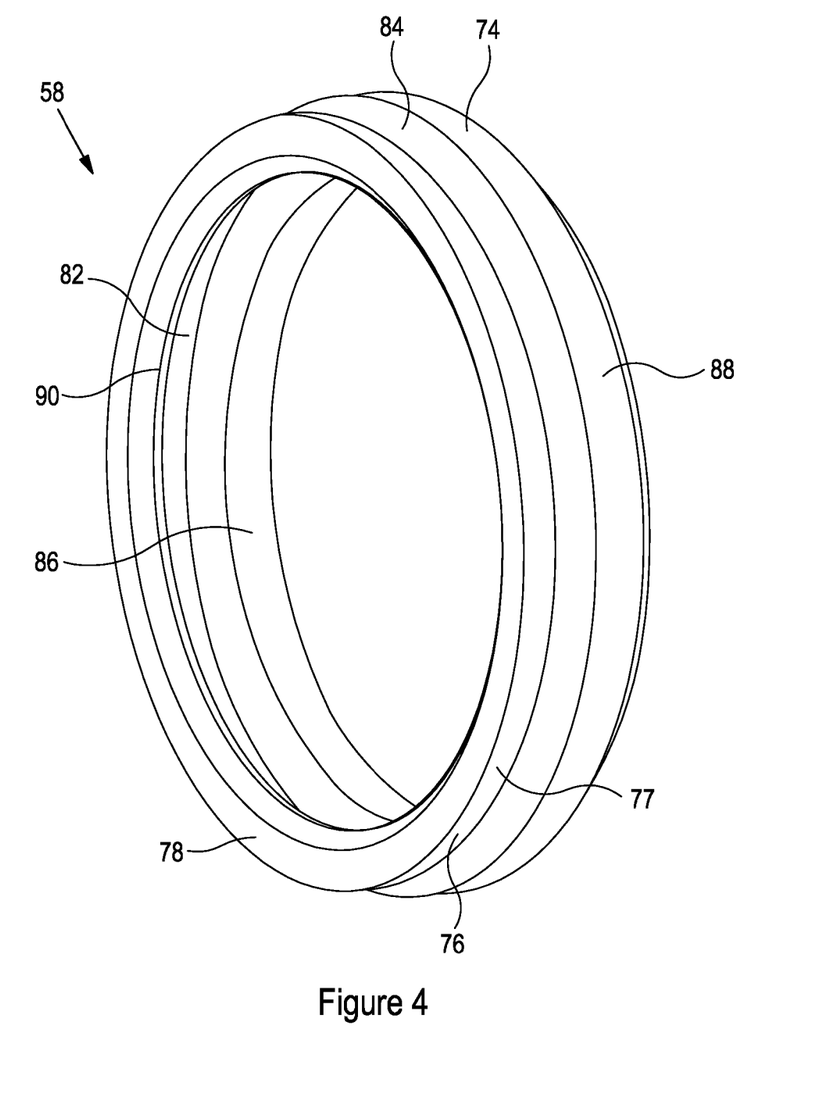
FIG. 4 depicts a perspective view of a seal for use in an embodiment of the present disclosure.

The annular seal 58, which is best seen in FIGS. 3 and 4, comprises a base 74 and a sealing portion 76. The sealing portion 76 comprises a seal lip 90. The seal lip 90 is the inside diameter of the sealing portion 76. The seal lip 90 is configured to form a seal with the flange 62 of the oil seal plate 42. By forming a seal with the oil seal plate 42, the seal lip 90 prevents oil from leaking out of the bearing housing 8 and into the compressor 6. The sealing pressure exerted by the seal lip 90 on the flange 62 may be at least the pressure of the bearing housing 8. For example, the sealing pressure may be up to 60 mbar when the shaft is stationary. The sealing pressure provided by the seal lip 90 may be at least 10 mbar when the shaft 18 is stationary. The sealing pressure provided by the seal lip 90 may be up to 200 mbar when the shaft 18 is stationary. The outside diameter of the sealing portion 76 may be less than the internal diameter of the flange 68 of the rotatable seal housing 44. The annular seal 58 may be made from any suitable material, for example hydrogenated nitrile rubber (HNBR), Teflon, silicon or PTFE.

The annular seal 58 comprises a first end 78 which faces towards the compressor 6 and a second end 80 which faces towards the bearing housing 8. The outside diameter of the first end 78 may be less than the outside diameter of the second end 80.

The annular seal 58 may comprise an annular groove 82. The annular groove 82 is located between the sealing portion 76 and the base 74 of the annular seal 58. In the depicted embodiment, the groove 82 extends radially outwardly from an internal surface 86 of the annular seal 58. Alternatively, the groove 82 may extend radially inwardly from an external surface 88 of the annular seal 58.

The annular seal 58 comprises an intermediate section 84 located between the sealing portion 76 and the base 74. The cross-sectional profile of the intermediate section 84 may inwardly taper, as depicted. Alternatively, the cross-sectional profile of the intermediate section 84 may be any suitable shape, for example the profile may form part of an arc. Alternatively, the intermediate portion 84 may form a step which separates the diameters of the base 74 and the sealing portion 76.

The annular seal 58 may be moulded directly into the flange 68 of the rotatable seal housing 44. Moulding the annular seal 58 directly into the flange 68 allows the base 74 to be bonded to the flange. Bonding the annular seal 58 to the flange 68 allows the annular seal to be fixed with respect to the rotatable seal housing 44. Alternatively, the annular seal 58 may be formed separately and received in the flange 68 via an interference fit. When the annular seal 58 has been moulded or received in the flange 68, an annular space 71 is present between the sealing portion 76 and the annular wall 72 of the flange.

The base portion 74 of the annular seal 58 may be any suitable shape such that sealing contact with the rotatable seal housing 44, or other rotatable component, is achieved. For example, in an alternative embodiment (not depicted) the base portion 74 may form an L-shape which follows the annular wall 72 of the flange 68 and a radial wall 75 of the rotatable seal holder 44 from which the flange 68 extends. In the embodiment comprising an L-shaped base portion 74, the sealing portion 76 may extend axially from the base portion so as to form a U-shape. In this embodiment or other embodiments the base portion 74 may be provided with an internal support structure (not shown) which is formed into the base portion. The internal support structure may for example be formed from metal (e.g. steel). The internal support structure may act to increase the rigidity of the base portion.

In a further alternative embodiment, the base portion 74 may or may not be integral to the sealing portion 76. For example, the base portion 74 may be formed of a metal (e.g. steel) and the sealing portion 76 may be bonded to the base portion.

As discussed above, the annular seal 58 is fixed with respect to the rotatable seal housing 44 and the seal lip 90 of the annular seal is configured to form a seal with the oil seal plate flange 62 of the oil seal plate 42. However, the sealing pressure exerted by the sealing lip 90 is configured to decrease with increasing shaft 18 speed such that when the shaft 18 is rotating at, or greater than, a predetermined rotational speed, the sealing portion 76 is configured to move radially outwards with respect to the turbocharger axis 34. When rotating at, or above, the predetermined speed, the sealing portion moves radially outwards such that it loses contact with the flange 62 of the oil seal plate 42.

Starting from the shaft 18 being stationary, the sealing pressure provided by the sealing lip 90 is at its maximum, or initial, value. The initial sealing pressure value may be greater than or equal to the pressure inside the bearing housing 8. The initial value may be 60 mbar or more, as noted above. With increasing shaft 18 speed, the sealing pressure decreases. This is by virtue of the centrifugal force acting on the annular seal 58. The relationship between the sealing pressure provided by the sealing portion 76 and the rotational speed of the shaft 18 follows the relationship of centrifugal force, such that the sealing pressure at a given shaft rotational speed may be approximated by the following equation:

$$P = I - \frac{m\omega^2 r}{A}$$

Where:
'P' is the sealing pressure at a given rotational speed (of the shaft 18);
'I' is the initial sealing pressure provided by the sealing portion 76;
'm' is the effective mass of the sealing portion 76;
'ω' is the rotational speed of the shaft 18;
'r' is the radial distance from the shaft axis 34 to a central point within the sealing portion 76; and
'A' is the contact area between the sealing lip 90 and the flange 62.

The equation uses the effective mass of the sealing portion 76 because a portion of the mass of the intermediate portion 84 of the annular seal 68 will contribute towards the mass of the sealing portion 76.

The radial distance 'r' may not be the radial midpoint between the sealing lip 90 and the outside diameter of the first end 78. The radial distance 'r' may be the distance to a local centre of effective mass of the sealing portion 76.

The centrifugal force acting on the sealing portion 76 results in an equilibrium rotational speed. When rotating at the equilibrium rotational speed, the centrifugal force due to rotation of the annular seal 58 equals the sealing force of the sealing portion 76. The resultant sealing pressure provided by the sealing portion 78 when the rotational speed of the shaft 18 equals the equilibrium speed is zero. Therefore, the sealing portion 76 provides a sealing effect at speeds below the equilibrium speed. Above the equilibrium speed, the sealing portion 76 is subject to sufficient centrifugal force to cause the sealing portion to deform. Specifically, the centrifugal force causes the sealing portion 76 to move radially outwards with respect to the turbocharger axis 34. Preferably, the axial displacement of the sealing portion 76 will be negligible above the predetermined speed. Limiting the sealing portion 76 to radial expansion advantageously results in a more compact arrangement as it is not necessary to provide a space into which the sealing portion 76 can axially displace into. The annular groove 82 may provide a predetermined hinging region to allow the sealing portion 76 to hinge with respect to the base 74.

The speed at which zero sealing pressure is provided by the sealing portion 76 may be tuned such that it corresponds to other operational parameters of the turbocharger 2 having a desired level. For example, the PDOS being sufficiently high to provide a sealing effect. In such configurations, the equilibrium speed may be referred to as a predetermined speed. In order to configure the seal 58 such that a desired predetermined speed is achieved, the material from which the annular seal 58 is made may be chosen to have an appropriate elasticity. Alternatively or additionally, the mass of the sealing portion 76 and/or the volume of the annular groove 82 may be chosen such that the sealing pressure reduces to zero at a desired predetermined speed is achieved.

As noted above, the predetermined speed at which the sealing pressure reduces to zero may be chosen such that the sealing portion 76 provides zero sealing pressure when a sufficiently positive PDOS is achieved. Positive PDOS should be understood as meaning situations wherein the pressure in the volume 48 behind the compressor 16 is greater than the pressure inside the bearing housing 8. A sufficiently positive PDOS provides sufficient pressure in the volume 48 behind the compressor impeller 16 to provide a sealing effect and therefore prevent oil leaking out of the bearing housing 8 and into the compressor 6. However, it should be understood it is not necessary that a positive PDOS is present when the shaft 18 is at the predetermined speed at which the sealing pressure is zero. Provided that the PDOS is not negative (which would occur when the pressure in the bearing housing 8 is greater than the pressure in the volume 48 behind the compressor), a sealing effect is provided. However, it may be desirable to have a positive PDOS when the shaft 18 is at the predetermined speed at which the sealing pressure is zero, in order to provide a margin of error so as to ensure that oil does not leak out of the bearing housing 8.

The speed at which a sufficiently positive PDOS is achieved varies between different turbocharger assemblies and may for example depend upon the diameter of the shaft 18. However, the surface speed of the shaft 18 to achieve a sufficiently positive PDOS may be approximately 16.5 m/s, for turbocharger assemblies with different shaft diameters. A maximum tip speed of a compressor impeller may generally be the same irrespective of the diameter of the compressor impeller. Consequently, turbochargers with smaller compressor impellers and smaller shafts rotate at higher rotational speeds (when compared to turbochargers with larger compressor impellers), but the surface speed of the shaft may remain the same. The corresponding rotational speed may be at least 5,000 revolutions per minute. In some applications, the corresponding rotational speed may be up to 50,000 revolutions per minute. However, provided that the PDOS generated is either zero or positive, the corresponding rotational speed may be any suitable value.

Advantageously, configuring the annular seal 58 such that it expands radially outwards once a positive PDOS is achieved may allow the positive PDOS to contribute to the centrifugal force acting on the sealing portion 76 to move the sealing portion radially outwards. This is due to the pressure acting to force the sealing portion such that it move radially outwards (i.e. the pressure in the volume 48 behind the compressor) being greater than the pressure acting to force the sealing portion radially inwards (i.e. the bearing housing 8 pressure).

The pressure provided in the volume 48 behind the compressor impeller 16 at the predetermined speed should be greater than the pressure of the bearing housing 8. It may be desirable to provide a margin of error to the predetermined speed so as to ensure that the PDOS is sufficiently positive to prevent oil leaking out of the bearing housing 8. For example, it may be desirable to tune the predetermined speed to be such that it coincides with a PDOS of 8 mbar.

This arrangement advantageously provides an annular seal 58 which forms a seal at low speeds and loses contact with the surface against which it is sealing at high speeds. Using the annular seal 58 to form a seal at low speeds allows the idle speed of the shaft 18 to be lower in comparison to turbochargers with conventional compressor seal assemblies. A typical idle shaft 18 speed is between 20,000 and 25,000 rpm. The present disclosure may allow the turbocharger 2 to be bypassed such that the speed of the shaft 18 when idling is zero. This is because it is not necessary to generate a sufficiently positive PDOS to prevent oil leaking from the bearing housing 8. This is because the sealing effect at low rotational speed is instead provided by the sealing portion 76. When the turbocharger 2 is bypassed, no exhaust gas flows through the turbine 4 of the turbocharger 2. Instead, the exhaust gas from the engine is diverted to after treatment. In after treatment, the exhaust gas is treated to remove certain molecules, for example nitrogen oxides, before the exhaust gas is expelled into the atmosphere.

Further, avoiding contact between the oil seal plate flange 62 and the sealing portion 76 at high speeds prevents overheating of the annular seal 58 due to friction. Increasing rotational speed results in increasing friction, this in turn results in increasing heat generation. Seals are typically manufactured from elastomeric materials or rubber, which are not suitable for prolonged high temperature operation. Subjecting a seal to prolonged, high temperature operation may damage the seal which may impair the ability of the seal to provide a sealing effect. By providing a seal which moves radially outwardly above a predetermined speed, contact between the seal and the oil seal plate flange 62, and therefore damage to the annular seal 58, is avoided.

The intermediate portion 84 of the annular seal 58 is designed so as to be sufficiently flexible so as to allow the sealing portion 76 to move radially outwards when the shaft 18 is rotating above the predetermined speed. Additionally, the flexibility of the intermediate portion 84 allows the sealing portion 76 to apply sufficient sealing pressure (e.g. 60 mbar) when rotating below the predetermined speed.

The internal diameter of the annular wall 72 may be greater than the external diameter of the sealing portion 76. The annular wall 72 of the flange 68 of the rotatable seal housing 44 limits the extent to which the sealing portion 76 can move radially outwards. As noted above, there is an annular space 71 present between an outside surface 77 of the sealing portion 76 of the annular seal 58 and the annular wall 72 of the flange 68. This provides space into which the sealing portion 76 can move radially outwards into when rotating above the predetermined rotational speed. It is desirable to limit the extent to which the sealing portion 76 can move radially outwards as over-expansion could result in damage to the annular seal 58 which may inhibit the sealing effect provided by the annular seal 58. The difference in radius between the outside surface 77 of the sealing portion and the annular wall 72 of the flange 68 determines the amount by which the sealing portion moves radially outwards when the shaft 18 is rotating above the predetermined rotational speed. The difference in radius may be sufficient to prevent the sealing portion contacting the annular flange 62 of the oil seal plate 42 when the shaft 18 is rotating above the predetermined rotational speed. The difference in radius could be at least 0.1 mm. However, in some applications, this value could be 0.2 mm. In other applications, this value could be 1 mm. In some applications, the value could be 5 mm. This value is dependent on the bearing configuration of the turbocharger 2, for example the distance between the radial bearing assemblies 20. For example a larger distance between the radial bearing assemblies 20 may allow the difference in radius to be smaller because accidental contact between the sealing portion 76 and the flange 62 of the oil seal plate 42 when rotating above the predetermined rotational speed is less likely.

Figure 5:
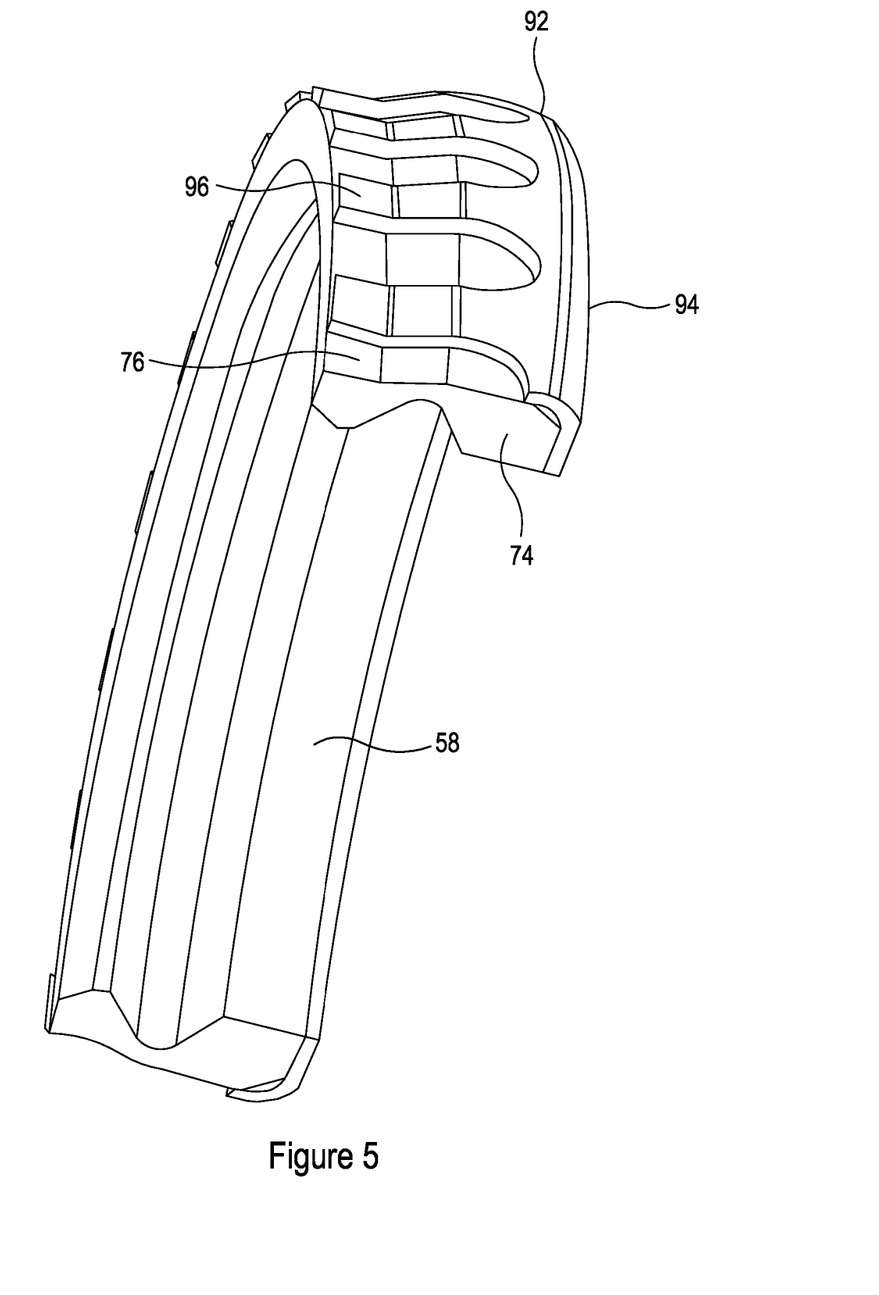
FIG. 5 depicts a cut-away perspective view of the seal comprising an annular element in accordance with an embodiment of the present disclosure.
Figure 7:
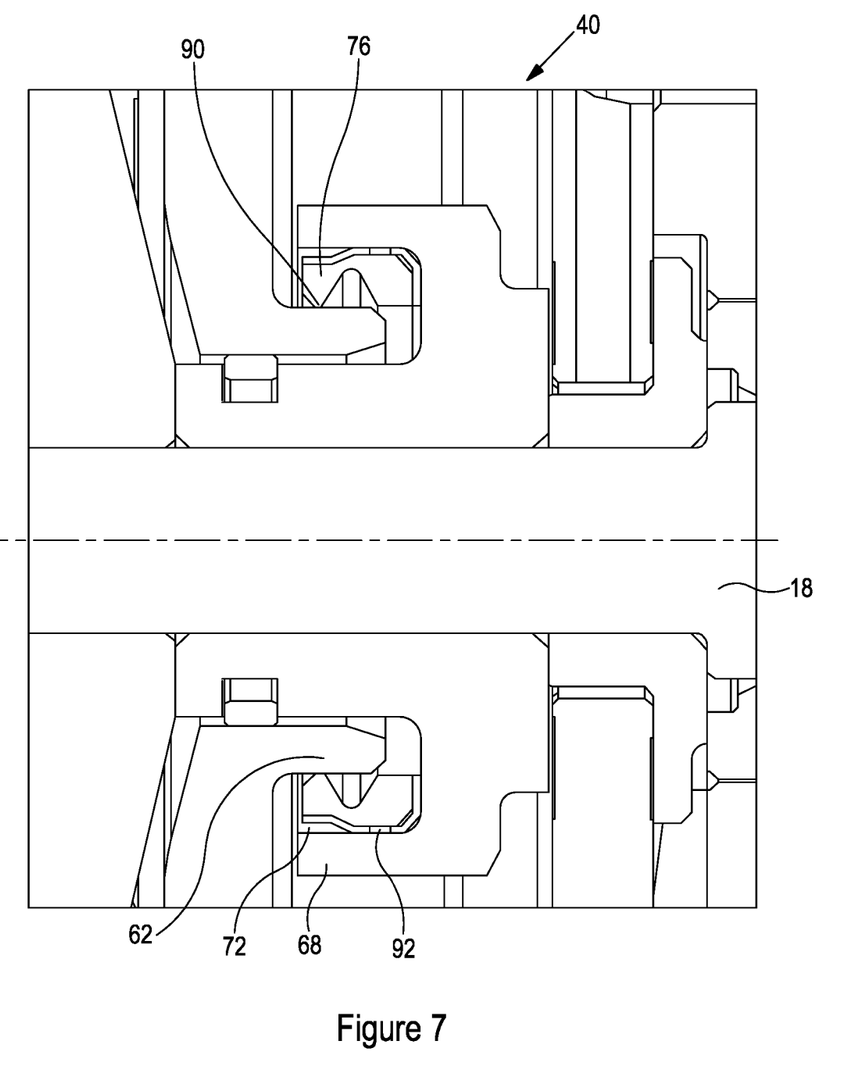
FIG. 7 depicts a cross-sectional view of a seal assembly in accordance with an embodiment of the present disclosure, wherein the shaft is rotating below a predetermined speed.
Figure 8:
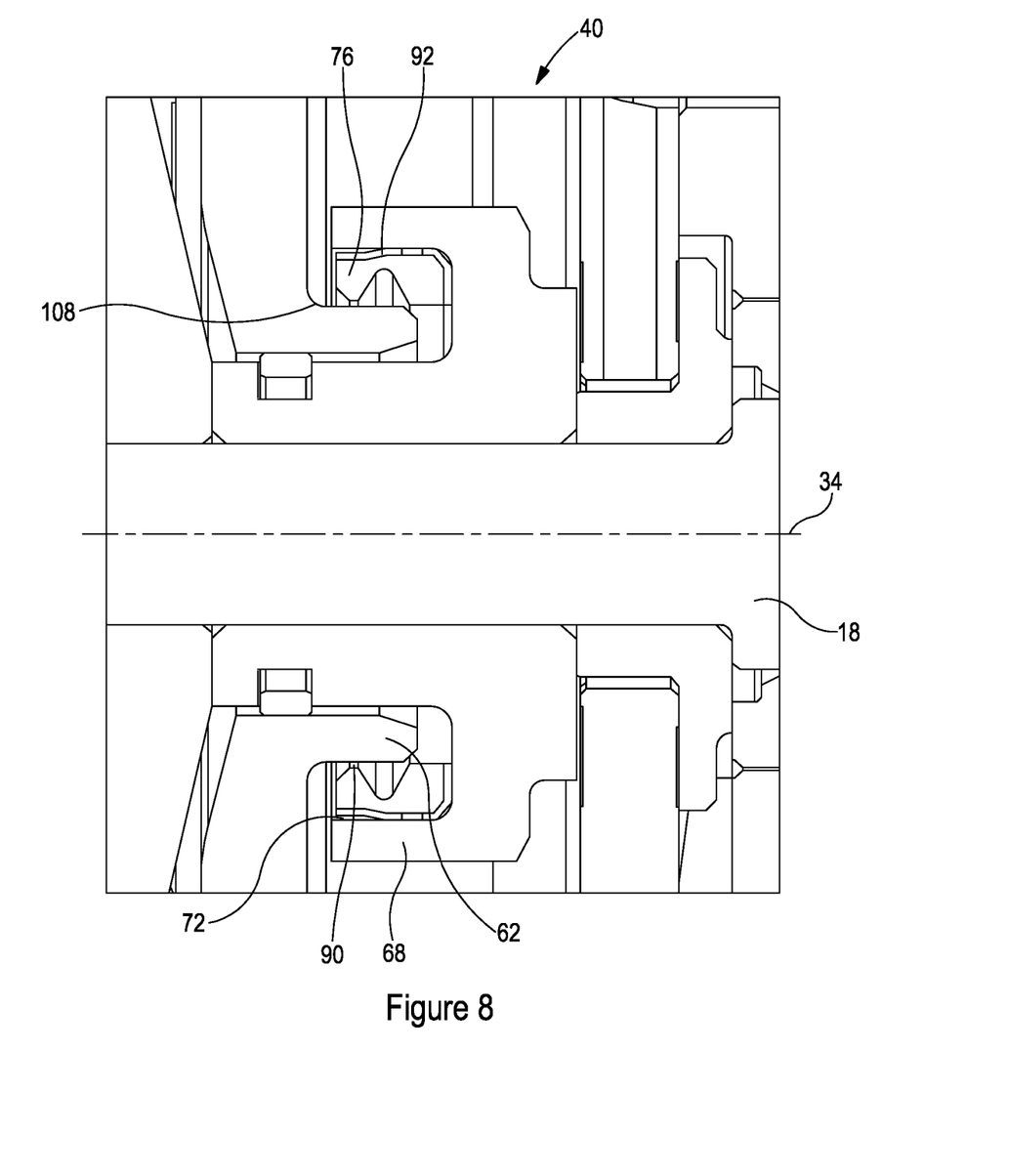
FIG. 8 depicts a cross-sectional view of a seal assembly in accordance with an embodiment of the present disclosure, wherein the shaft is rotating above predetermined speed.

In a further embodiment, shown in FIGS. 5, 7 and 8, the compressor seal assembly 40 may further comprise a seal holder 92, which is best seen in FIG. 5. The seal holder is annular in form and may be referred to as an annular component. The seal holder 92 encircles at least part of the annular seal 58. The annular seal 58 generally corresponds to that of the first embodiment, other than a reduced outside diameter of the base 74 to allow the seal holder 92 to be received in the recess 70 of the flange 68 of the rotatable seal housing 44. Alternatively, the internal diameter of the flange 68 may be increased in order to accommodate the seal holder 92. The seal holder 92 is received in the annular recess 70 of the flange 68 via an interference fit. The annular seal 58 may be moulded into the seal holder 92 during manufacture of the annular seal. The seal holder 92 may be made of any suitable material, for example spring steel, stainless steel or mild steel. Additionally, the seal holder 92 may be provided with a coating which increases the coefficient of friction between the seal holder 92 and the flange 68. The coating may be rubber. Alternatively, the coating may be any suitable elastomeric material. Coating the seal holder 92 may aid the retention of the seal holder in the recess 70 of the flange 68 of the rotatable seal holder 44. Additionally, coating the seal holder 92 with rubber, or another suitable material, may aid the bonding of the annular seal 58 to the seal holder 92 when the annular seal is moulded into the seal holder during manufacture of the annular seal.

FIG. 5 shows an isometric cut-away view of an embodiment of the seal holder 92. In the depicted embodiment, the seal holder 92 comprises a body 94 and a series of castellations, or fingers, 96. The fingers 96 extend from the body 94. In use, the body 94 of the seal holder 92 encircles the base 74 of the annular seal 58 and the fingers 96 extend over the sealing portion 76 of the annular seal 58.

In a variation which is not depicted, the fingers 96 of the seal holder 92 may extend over the first end 78 of the annular seal 58. When the fingers 96 extend over the first end 78 of the annular seal 58, the fingers may comprise an extension which extends circumferentially in one or both directions from the respective finger. The extensions may be provided so as to increase the contact area between the fingers 96 and the first end 78 of the annular seal 58. Alternatively, the fingers 96 may simply extend over the first end 78 of the annular seal 58. These features advantageously prevent the annular seal 58 from extruding out of the flange 68 of the rotatable seal housing 44 towards the compressor 6 which may occur when the shaft 18 is rotating at high speed.

The seal holder 92 may be provided so as to tune the predetermined speed. Due to geometry constraints, it may not be possible to design the annular seal 58 such that the intermediate 84 and/or sealing portion 76 is sufficiently stiff so as to maintain some sealing pressure up to a desired predetermined speed. Therefore, the seal holder 92 may be configured to provide a closing force to the sealing portion 76 and/or intermediate portion 84. The seal holder 92 may therefore increase the stiffness of the intermediate portion 84 and/or sealing portion 76. It may also be desirable to provide the seal holder 92 so as to reduce the material required to manufacture the annular seal 58. The position, quantity and size of the fingers 96 may be chosen so as to achieve the desired stiffness and thereby tune the equilibrium speed to achieve the desired predetermined speed. For example, the quantity, width or stiffness of the fingers 96 can be chosen so as to achieve the desired predetermined speed.

Figure 6:
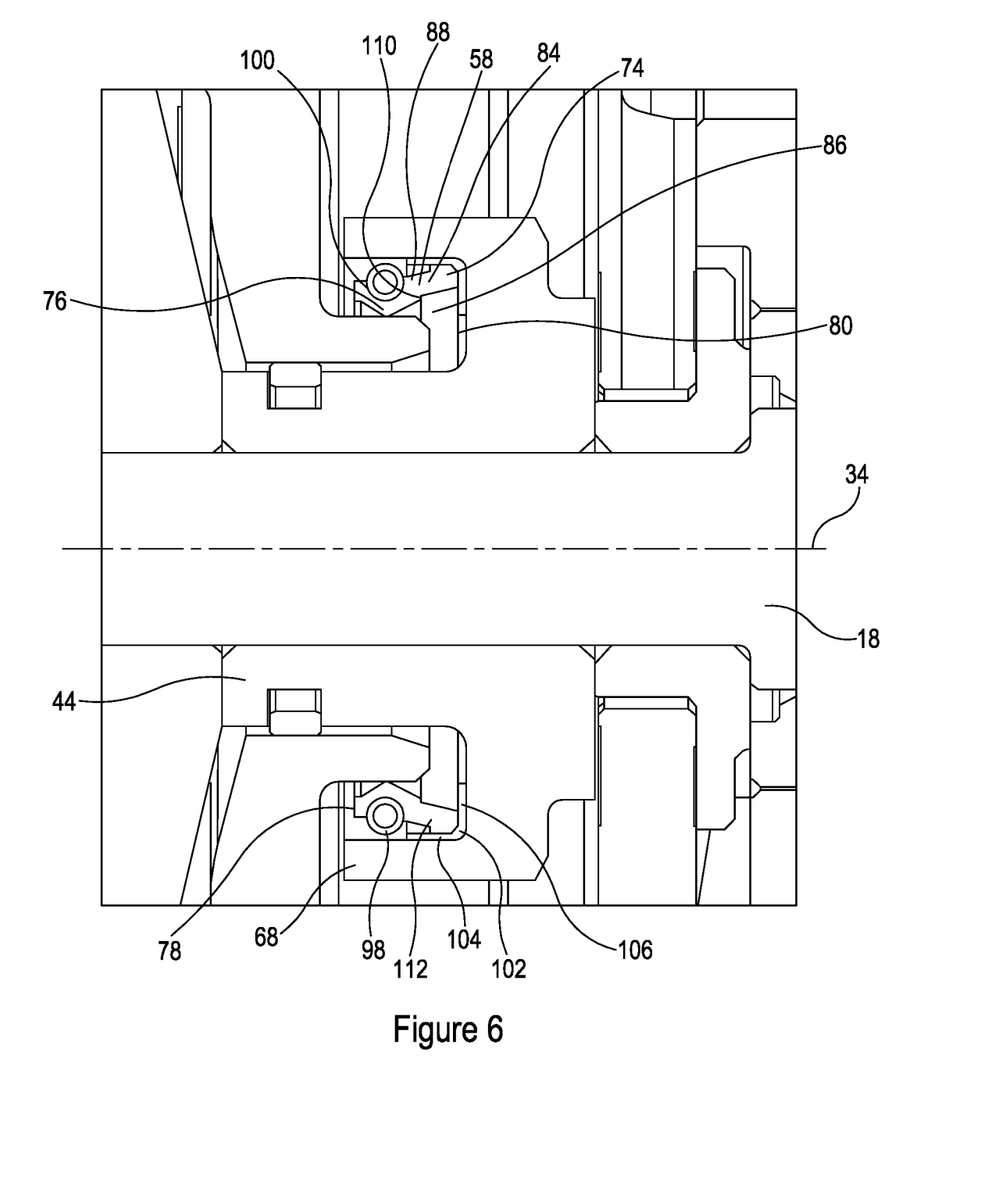
FIG. 6 depicts a cross-sectional view of a seal assembly in accordance with an embodiment of the present disclosure.

In a further embodiment, the compressor seal assembly comprises a garter spring 98. This embodiment is shown in FIG. 6. In order to accommodate the garter spring 98 the annular seal 58 is provided with an external recess 100. The external recess 100 may receive at least a portion of the garter spring 98. For example, the external recess 100 may accommodate an interior half of the circumference of the garter spring 98. The external recess 100 may encircle the sealing portion 76 of the annular seal 58. The spring stiffness of the garter spring 98 may be chosen so as to achieve a desired predetermined speed. Although not depicted, the annular seal 58 of this embodiment could be provided with an annular groove similar to the annular groove 82 of the previous embodiments. The annular groove could extend into the internal surface 86 of the annular seal 58. Alternatively, the annular groove could extend into the external surface 88 of the annular seal.

The annular seal 58 of this embodiment may be provided with a modified seal holder 102. The modified seal holder 102 comprises an axial section 104 and a radial section 106. The axial section 104 extends parallel to the turbocharger axis 34. The radial section 106 extends radially with respect to the turbocharger axis 34. The axial section 104 encircles the circumference of the base 74 of the annular seal element 58. The radial section 106 extends over the second end 80 of the annular seal element 58. Although not depicted, the seal holder 102 may comprise fingers which extend axially from the axial section 104. The fingers may extend over the first end 78 of the annular seal 58. This prevents the annular seal 58 from extruding out of the flange 68 of the rotatable seal housing 44 towards the compressor 6 (which may otherwise occur when the shaft 18 is rotating at high speed). If the seal holder 102 is provided with fingers, it may be necessary to increase the internal diameter of the flange 68 of the rotatable seal holder 44 in order to provide sufficient space between the outer diameter of the garter spring and the internal diameter of the flange 68 of the rotatable seal holder 44 to allow the sealing portion 76 to move radially outwards.

Alternatively, the axial section 104 of the seal holder 102 may extend over the first end 78 of the annular seal 58 without splitting into finger portions (i.e. as a continuous annular section). In this modification, the seal holder 102 may be provided as a first annular part and a second annular part which join together so as to achieve the desired shape. One of the annular parts may have a smaller diameter than the other annular part and may be axially received in the other annular part. Providing the seal holder 102 as two separate annular parts may aid manufacturing.

Alternatively, in a modification which is not depicted, the seal holder comprises a radial section which extends over the first end 78 of the annular seal 58 and an axial section which extends form the radial section towards the bearing housing 8. This seal holder may be used with any of the embodiments described.

The annular seal 58 of this embodiment further comprises a first step 110 which defines a transition between the sealing portion 76 and the intermediate portion 84. The annular seal further comprises a second step 112 which defines a transition between the intermediate portion 84 and the base 74. The first step 110 provides a step-up of material thickness from the intermediate portion 84 to the sealing portion 76. This allows the sealing portion 76 to apply the required sealing pressure whilst reducing the flexibility of the intermediate portion 84. The reduction of flexibility of the intermediate portion 84 allows the sealing portion 76 to move radially outwardly when rotating above the predetermined speed. The second step 112 provides a step-up of material thickness form the intermediate portion 84 to the base 74. This allows an annular space to be provided into which the sealing portion 76 can move radially outwards. This step-up of material thickness also allows the base 74 to be sufficiently rigid so as to maintain the shape of the annular seal 58 during operation. Additionally, the step-up of material thickness between the intermediate portion 84 and both the sealing portion 76 and the base 74 allows the sealing portion to hinge, therefore allowing the sealing portion to move radially outwards.

FIGS. 7 and 8 show the compressor seal assembly 40 when the shaft 18 is rotating below the predetermined rotational speed and when the shaft 18 is rotating above the predetermined rotational speed respectively. Although these Figures show the compressor seal assembly 40 comprising a seal holder 92, the same effect is present in all of the embodiments described. As can be seen from FIG. 8, when the rotational speed of the shaft 18 is above the predetermined rotational speed, the sealing portion 76 moves radially outwards such that the sealing portion loses contact with the oil seal plate flange 62, thereby providing an annular space 108 between the sealing lip 90 and the oil seal plate flange. In one example, the inside diameter of the sealing portion 76 may be configured to move radially outwards by at least 100 μm. In some applications, this value could be 200 μm. In some applications, this value could be 1 mm. In some applications, this value could be 5 mm. The amount by which the sealing portion is configured to move radially outwards depends on the bearing configuration of the turbocharger or the application of the annular seal 58, as noted. Additionally, the annular seal 58 may be required to move radially outwards by a larger or smaller amount to allow for manufacturing tolerances and/or bearing clearances. The annular space 108 is intended to be sufficiently large so as to avoid accidental contact between the sealing portion 76 and the oil seal plate flange 62 while the shaft 18 is rotating above the predetermined rotational speed. In FIG. 8, the sealing portion 76 has not deformed to the point where it is in contact with the annular wall of the flange 68 of the rotatable seal housing 44. However, it will be appreciated that when the shaft 18 is rotating at a sufficiently high speed, the sealing portion 76 may come into contact with the flange 68. This allows the flange 68 to limit the radial expansion of the sealing portion 76.

To summarise, the annular seal 58 may exert a maximum sealing pressure when the shaft 18 is stationary. As the speed of the shaft 18 increases, the sealing pressure provided by the sealing portion 76 reduces. The speed at which zero sealing pressure is provided may be tuned such that at this speed, the pressure of the volume 48 behind the compressor impeller 16 is sufficiently larger than the pressure in the bearing housing 8 to provide a sealing effect. This speed may be between 17,000 and 40,000 revolutions per minute, depending on the turbocharger specification. However, the surface speed of the shaft 18 may be 16.5 m/s. In some applications, the surface speed may be at least 10 m/s. In some applications, the surface speed may be at least 5 m/s. In some applications the surface speed of the shaft 18 may be up to 20 m/s. In some applications the surface speed of the shaft 18 may be up to 40 m/s. The surface speed of the shaft 18 may be between any of the above-mentioned values. For example, the surface speed of the shaft 18 may be between 10 m/s and 20 m/s. Alternatively, the surface speed of the shaft 18 may be between 5 m/s and 40 m/s. Above this predetermined speed, the sealing portion 76 of the annular seal 58 continues to move radially outwards until a maximum value is reached, which is determined by the annular wall 72 of the flange 68 of the rotatable seal housing 44.

It will be appreciated that modifications can be made to the apparatus described without departing from the scope of the disclosure. For example, although annular seal 58 has been described as forming a seal with the flange 62 of the oil seal plate 42, the annular seal 58 may form a seal with other regions of an oil seal plate. Additionally, although the embodiment of FIG. 6 was described as comprising a garter spring 98, the garter spring may be replaced with any other annular resilient element. Further, although the embodiments have been described with respect to a turbocharger, the present disclosure is suitable for use in any turbomachine. Additionally, the seal holder 92 can be any annular element which encircles at least part of the annular seal 58.

What is claimed is:

1. A seal assembly for use in a turbomachine, the seal assembly comprising:
   an oil seal plate;
   a rotatable component which defines a central axis and is received in a central aperture of the oil seal plate; and
   an annular seal which comprises a base and a sealing portion, the base being held by the rotatable component;
   wherein the sealing portion is configured to form a seal with the oil seal plate when the rotatable component and annular seal are rotating below a predetermined rotational speed; and
   wherein the sealing portion is configured to move radially outwards with respect to the central axis such that the sealing portion loses contact with the oil seal plate when the rotatable component and annular seal are rotating above the predetermined rotational speed.

2. The seal assembly of claim 1, wherein the rotatable component comprises a flange which defines an annular recess that receives the seal.

3. The seal assembly of claim 2, wherein an internal diameter of the flange is greater than an external diameter of the sealing portion.

4. The seal assembly of claim 2, wherein the flange defines an inner annular wall which limits radial movement of the sealing portion.

5. The seal assembly of claim 1, wherein the seal assembly further comprises an annular component which encircles at least part of the annular seal.

6. The seal assembly of claim 5, wherein the annular component is configured to provide a resilient bias to the sealing portion.

7. The seal assembly of claim 5, wherein the annular component comprises an annular body and a series of fingers which project from the annular body.

8. The seal assembly of claim 7, wherein the fingers extend axially to a distal end of the sealing portion.

9. The seal assembly of claim 7, wherein the fingers extend radially inwards at the distal end of the sealing portion.

10. The seal assembly of claim 1, wherein the seal comprises an annular groove located between the sealing portion and the base.

11. The seal assembly of claim 1, wherein an outside diameter of the sealing portion of the annular seal element is less than an outside diameter of the base of the annular seal element.

12. The seal assembly of claim 1, wherein above the predetermined rotational speed the sealing portion is configured to move radially outwards such that the internal diameter of the sealing portion increases by at least 0.1 mm.

13. The seal assembly of claim 1, further comprising an annular resilient element which encircles the sealing portion of the annular seal.

14. A rotary seal for use in a seal assembly of a turbomachine, the rotary seal comprising:
    a base;
    a sealing portion; and
    an intermediate portion located between the base and the sealing portion;
    wherein when intermediate portion is sufficiently stiff so as to allow the sealing portion provide a sealing effect and is sufficiently flexible such that when the seal rotates above a predetermined rotational speed, the sealing portion is configured to move radially outwards.

15. The rotary seal of claim 14, further comprising an annular component which encircles at least part of the rotary seal.

16. A turbomachine comprising:
    a turbine;
    a housing;
    a bearing housing;
    a compressor having a compressor impeller mounted within the housing on a shaft;
    a volume located behind the compressor impeller;
    a compressor seal assembly, the compressor assembly comprising:
       an oil seal plate;
       a rotatable component which defines a central axis and rotates with the shaft;
       an annular seal which comprises a base and a sealing portion, wherein the base is held by the rotatable component;
       wherein the sealing portion is configured to form a seal with the oil seal plate when the shaft is rotating below a predetermined rotational speed;
       wherein the sealing portion is configured to move radially outwards with respect to the central axis above the predetermined rotational speed such that the volume behind the compressor impeller is in fluid communication with the bearing housing.

17. A method of sealing a turbomachine, the turbomachine comprising:
    a turbine;
    a housing;
    a bearing housing;
    a compressor having a compressor impeller mounted within the housing on a shaft;
    a volume located behind the compressor impeller;
    a compressor seal assembly, the compressor assembly comprising:
       an oil seal plate;
       a rotatable component which defines a central axis and rotates with the shaft; and
       an annular seal which comprises a base and a sealing portion, wherein the base is held by the rotatable component;
    wherein the method comprises:
    rotating the shaft below a predetermined rotational speed and forming a seal between the sealing portion of the annular seal and the oil seal plate;
    rotating the shaft above the predetermined rotational speed and moving the sealing portion radially outwards such that contact between the sealing portion of the annular seal and the oil seal plate is lost.

18. The method of claim 17, wherein at the predetermined speed a pressure in the volume located behind the compressor impeller is greater than a pressure in the bearing housing.

19. The method of claim 18, wherein at the predetermined speed the pressure in the volume located behind the compressor impeller is at least 8 mbar greater than the pressure in the bearing housing.

20. The method of claim 17, wherein the method further comprises subsequently rotating the shaft below the predetermined rotational speed and moving the sealing portion radially inwards such that it forms a seal against the oil seal plate.

\* \* \* \* \*